May 23, 1933.  E. L. ROSE  1,910,639

RECTILINEAR ELECTROMAGNETIC MOTOR

Filed May 27, 1931

Edwin L. Rose, Inventor

By Richmond S. Hayes

His Attorney

Patented May 23, 1933

1,910,639

UNITED STATES PATENT OFFICE

EDWIN L. ROSE, OF CAMBRIDGE, MASSACHUSETTS, ASSIGNOR TO DAHLSTROM METALLIC DOOR COMPANY, OF JAMESTOWN, NEW YORK, A CORPORATION OF NEW YORK

RECTILINEAR ELECTROMAGNETIC MOTOR

Application filed May 27, 1931. Serial No. 540,358.

This invention relates to an improvement in a translating electro-magnetic motor in which the induced current coil constitutes the movable or work producing element.

The preferred embodiment of this invention discloses an electro-magnetic motor having fixed and movable coils. Current impressed in the fixed coils and induced in the movable coil establishes magnetic fields which react to cause translation of the movable coil in one of two directions.

The principal object of the invention is to provide a translating electro-magnetic motor which, when connected through a suitable linkage, may be made to perform useful work.

Another object of the invention is to provide a device of this class, the structure of which is rugged in design and simple in construction.

A further object of the invention is to provide a motor in which the size of the coils producing magnetic fields may be altered by which to vary the speed or power of the motor.

Other and further objects of the invention may be more clearly understood from a consideration of the following specification which is taken in conjunction with the accompanying drawing, and in which Fig. 1 is a front elevation of one modification of this invention;

Figure 1:
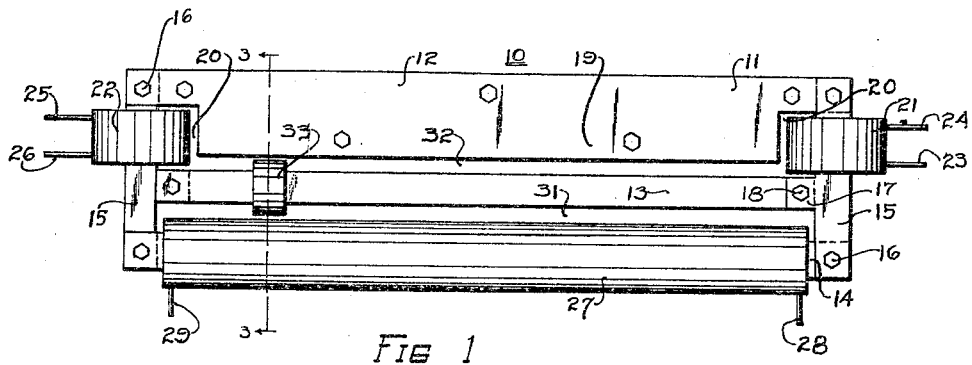
Figure 2:
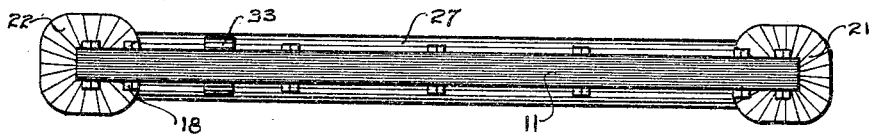
Fig. 2 is a plan view of the motor shown in Figure 1.
Figure 3:
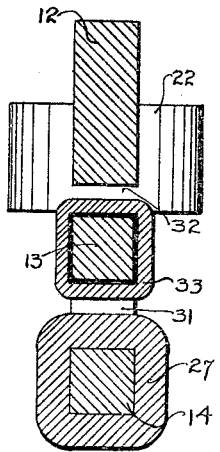
Fig. 3 is an enlarged vertical sectional view taken substantially on the line 3—3 of Figure 1.

Referring to the drawing, the induction motor, generally indicated by the reference numeral 10, is shown to comprise a laminated core 11. This core is formed with an upper horizontal rail 12, intermediate rail 13 and lower rail 14. The ends of the upper rail 12 and lower rail 14 are supported in spaced parallel relation by the perpendicular members 15 through the use of bolts 16.

The members 15 are formed with central horizontal portions 17 which, through the use of bolts 18, mount the rail 13 in spaced parallel relation to the upper and lower rails 12 and 14. The upper rail 12 is cut away adjacent its ends, thus producing a central downwardly projecting portion 19. In conjunction with the perpendicular members 15, slots 20 are also formed by the rail 12. The laminations comprising rails 12, 13 and 14 are preferably stacked in alternate layers as indicated by the dotted lines of the drawing.

Figure 4:
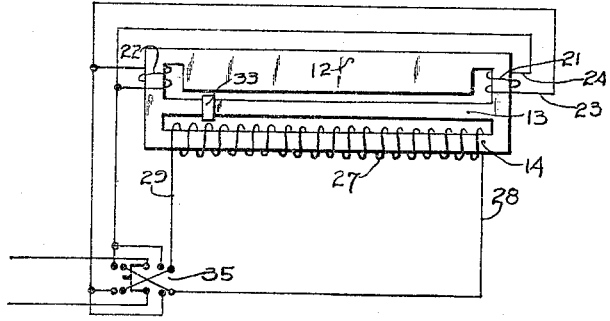
Fig. 4 is a schematic diagram showing the coil arrangement and means by which instantaneous direction of current is changed in certain of the coils.

Auxiliary coils 21 and 22 surround the perpendicular members 15 directly above the intermediate rail 13. The inner edge of each coil lies within one of the slots 20. Coil 21 is provided with leads 23 and 24 and coil 22 with leads 25 and 26 which, as shown in the diagram in Figure 4, are connected in parallel with a suitable source of current supply. A primary coil 27, extending substantially the full length of the motor is mounted on the lower laminated rail 14, being provided with leads 28 and 29. The intermediate rail 13 is spaced from both the upper and lower rails 12 and 14 by horizontal slots 31 and 32. The upper portion of coil 27 passes through the lower part of slot 31, being terminated along the inside edges of the members 15. A short circuited coil 33 loosely surrounds the intermediate rail 13, permitting longitudinal movement of said coil relative to said core. The lower side of the coil 33 lies in slot 31 and the upper side in slot 32. A reversing switch 35, shown in the diagram, is adapted to change the instantaneous direction of current in the primary coil 27 thus causing, in a manner about to be described, the short circuited coil 33 to move in one direction or the other upon the rail 13.

The translating motor above described is adapted to be operated on single phase alternating current. Leads 28 and 29, through switch 35, connect the primary coil 27 with a suitable source of current supply. Energizing coil 27 induces an electro-motive force in the short circuited coil 33 which is approximately 90 degrees out of phase with the impressed electro-motive force in said coil. Coils 21 and 22, being in parallel, are connected with a suitable source of current supply through switch 35 by leads 23, 25 and 24, 26. Energizing these coils simultaneously with coil 27 produces magnetic fields which react with the field set up by the induced current in the short circuited coil 33, causing the short circuited coil to move in one direction or the other. The switch 35, when shifted from one set of contacts to the other, reverses the instantaneous polarity of coils 21 and 22 relative to that of coil 33, by changing the current phase of the primary coil 27 one hundred eighty degrees relative to the other position of said switch.

By connecting the coil 33, through a suitable linkage, with any desired reciprocating element, useful power may be developed.

While applicant has shown and described but one modification of his invention, it is not intended that limitations be placed thereon since it is obvious that other modifications or adaptations may be made without departing from the spirit and scope of the invention as set forth in the hereunto annexed claims.

Having thus set forth my invention what I claim as new and for which I desire protection by Letters Patent is:

1. In a rectilinear electro-magnetic motor, a core having a plurality of parallel laminated rails, perpendicular members spacedly supporting the ends of said rails, coils mounted on said members, a secondary coil mounted on the intermediate of said rails, said secondary coil being movable longitudinally of said rail toward one or another of said coils.

2. A rectilinear electro-magnetic motor comprising a core having a plurality of parallel rails, perpendicular members spacedly supporting said rails, a primary coil mounted on one of said rails, auxiliary coils mounted on said members, a short circuited secondary coil movably mounted in close proximity with said primary coil, a source of current supply, and contact means adapted to connect all of said coils with said supply whereby to control the direction of motion of said secondary coil relative to said coils.

3. A rectilinear electro-magnetic motor comprising a core having outer and intermediate rails, members spacedly supporting said rails, a central portion on one of said outer rails projecting toward and into close proximity with said intermediate rail, said central portion and said members forming slots in said core, auxiliary coils mounted on said members and projecting through said slots, a short circuited secondary coil mounted on said intermediate rail, and a primary coil mounted on the other of said outer rails, said secondary coil being adapted to move longitudinally of said intermediate rail toward one or another of said auxiliary coils.

4. In a rectilinear electro-magnetic motor, a laminated core comprising a plurality of spaced parallel rails defining longitudinally extending slots, members engaged with and spaced supporting said rails, and a short circuited secondary coil mounted on the intermediate of said rails and occupying a part of each of said slots.

5. In a rectilinear electro-magnetic motor, a multiple rail core, a primary coil mounted on and extending the full length of one of said rails, spaced auxiliary coils, and means on said core supporting said auxiliary coils on an axis perpendicular to the axis of said primary coil.

6. In a rectilinear electro-magnetic motor, a core comprising a rail, a coil mounted on and extending substantially the length of said rail, and a short circuited secondary coil in close proximity with and adapted to move axially of said coil.

7. In a rectilinear electro-magnetic motor, a multiple rail core, a primary coil mounted on and extending substantially the length of one of said rails, an auxiliary coil adjacent each end of and mounted perpendicular to said primary coil and a short circuited secondary coil in close proximity with said primary coil, said secondary coil moving axially of said primary coil in one direction or the other upon excitation of said other coils.

8. In a rectilinear electro-magnetic motor, a core comprising a plurality of spaced, parallel rails supported at their ends by perpendicular members, auxiliary coils mounted on said members, a primary coil mounted on one of said rails, a short circuited coil slidably mounted on another of said rails, said short circuited coil being adapted to move longitudinally of said core when all of said coils are suitably energized from a source of alternating current supply.

In testimony whereof I have affixed my signature.

EDWIN L. ROSE.